US012718544B2

(12) United States Patent
O'Neil et al.

(10) Patent No.: US 12,718,544 B2
(45) Date of Patent: Aug. 25, 2026

(54) SYSTEM, DEVICES AND/OR PROCESSES FOR APPLICATION OF KERNEL COEFFICIENTS

(71) Applicant: Arm Limited, Cambridge (GB)

(72) Inventors: Liam James O'Neil, Bedale (GB); Joshua James Sowerby, Twickenham (GB); Yanxiang Wang, Manchester (GB); Maxim Novikov, Manchester (GB)

(73) Assignee: Arm Limited, Cambridge (GB)

( * ) Notice: Subject to any disclaimer, the term of this patent is extended or adjusted under 35 U.S.C. 154(b) by 464 days.

(21) Appl. No.: 18/339,042

(22) Filed: Jun. 21, 2023

(65) Prior Publication Data

US 2024/0029420 A1 Jan. 25, 2024

(30) Foreign Application Priority Data

Jul. 21, 2022 (GB) ..................................... 2210702

(51) Int. Cl.
*G06V 10/82* (2022.01)
*G06V 10/40* (2022.01)
*G06V 10/77* (2022.01)

(52) U.S. Cl.
CPC ............. *G06V 10/82* (2022.01); *G06V 10/40* (2022.01); *G06V 10/77* (2022.01)

(58) Field of Classification Search
CPC .... G06V 10/40; G06V 10/454; G06V 10/766; G06V 10/77; G06V 10/82
See application file for complete search history.

(56) References Cited

U.S. PATENT DOCUMENTS 5,231,674 A * 7/1993 Cleveland ............ G06V 40/193 382/199
2020/0204192 A1* 6/2020 Hamlin .............. H03H 17/0642
2020/0293857 A1 9/2020 Nakadai et al.
2021/0142448 A1* 5/2021 Yao ........................ G06N 3/044
2022/0207656 A1 6/2022 Yao et al.
2022/0284545 A1* 9/2022 Ahn ......................... G06N 3/08

FOREIGN PATENT DOCUMENTS

EP 4020377 A1 6/2022
GB 2620920 9/2024

OTHER PUBLICATIONS

Thomas, et al, "A Reduced-Precision Network for Image Reconstruction," ACM Trans. Graph., vol. 39, No. 6, Article 231, Dec. 2020, 12 pages.

(Continued)

*Primary Examiner* — Michael J Vanchy, Jr.
(74) *Attorney, Agent, or Firm* — Berkeley Law & Technology Group, LLP

(57) ABSTRACT

Example methods, apparatuses, and/or articles of manufacture are disclosed that may be implemented, in whole or in part, techniques to process image signal intensity values sampled from a multi color channel imaging device. In particular, methods and/or techniques disclosed herein are directed to processing image signal intensity values by application of kernel coefficients to the image signal intensity values.

20 Claims, 6 Drawing Sheets

(56) References Cited

OTHER PUBLICATIONS

Chen, et al, "Real-time Edge-Aware Image Processing with the Bilateral Grid," ACM Transactions on Graphics, vol. 26, Issue , https://doi.org/10.1145/1276377.1276506, Jul. 29, 2007, 9 pages.
Hasselgren, et al, "Neural Temporal Adaptive Sampling and Denoising," DOI: 10.1111/cgf.13919, EUROGRAPHICS 2020, vol. 39, No. 2, May 25, 2020, 9 pages.
Combined Search and Examination Report under Sections 17 and 18(3), App. No. GB2210702.3, Mailed Jan. 17, 2023, 6 pages.
Response to Combined Search and Examination Report, App. GB2210702.3, Filed Jan. 7, 2024, 16 pages.
Intention to Grant under Section 18(4), App. GB2210702.3, Mailed Jul. 16, 2024, 8 pages.

* cited by examiner

SYSTEM, DEVICES AND/OR PROCESSES FOR APPLICATION OF KERNEL COEFFICIENTS

This application claims the benefit of priority to UK patent application no. GB2210702.3 titled "SYSTEM, DEVICES AND/OR PROCESSES FOR APPLICATION OF KERNEL COEFFICIENTS" and filed on Jul. 21, 2022, which is incorporated herein by reference in its entirety.

BACKGROUND

1. Field

Techniques, devices and processes for application of kernel coefficients to image signal intensity values to impart an effect are described.

2. Information

According to an embodiment, coefficients to be applied to image signal intensity values to impart an intended effect in a processed image are typically arranged in an array as a "kernel." In particular implementations, coefficients arranged in a kernel may be determined and/or optimized for particular intended effects. In one such implementation of a kernel, coefficients may be determined, at least in part, by a kernel prediction networks (KPN) which may employ one or more neural networks to determine kernel coefficients.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
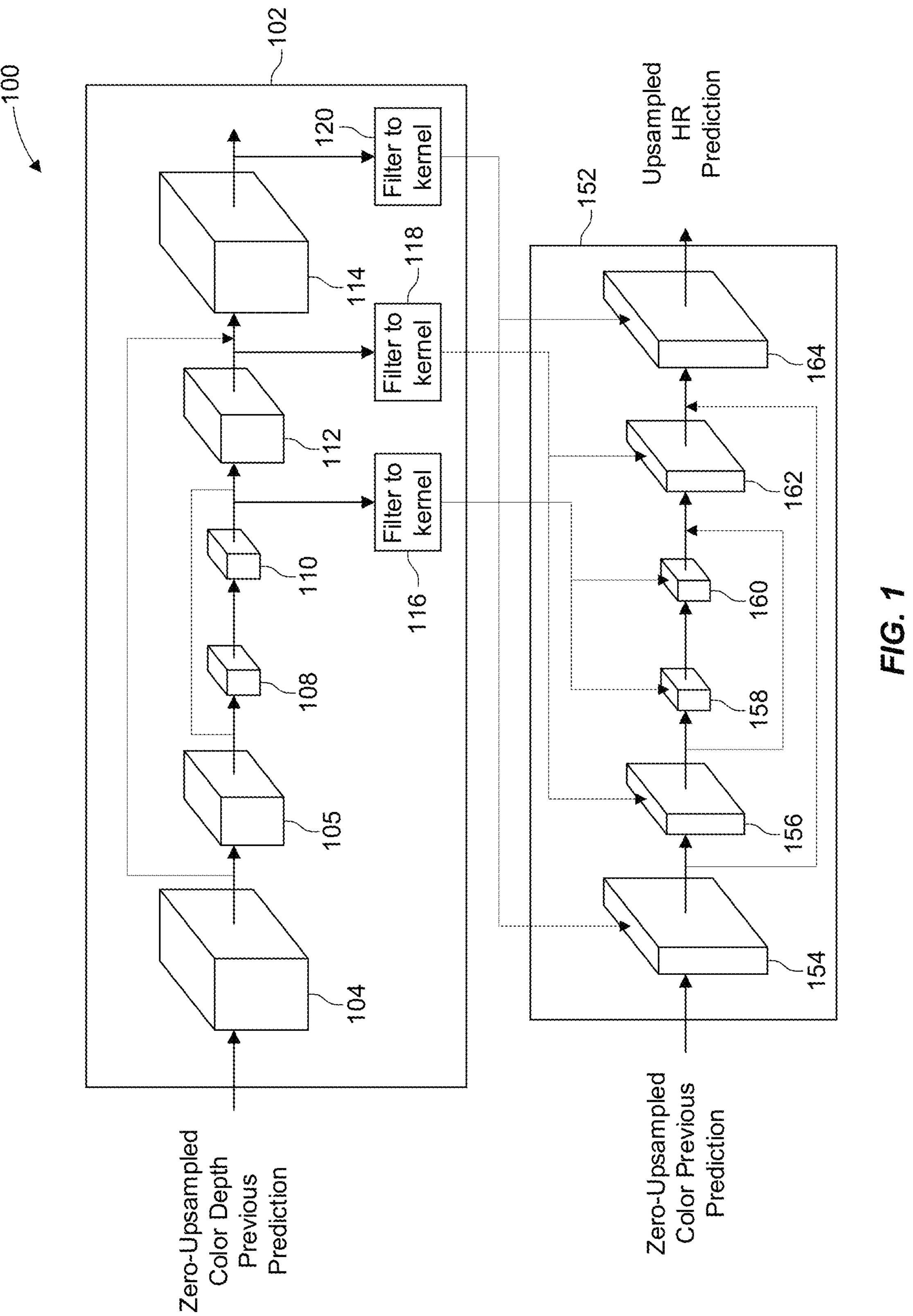
FIG. 1 is a schematic diagram of a kernel prediction network, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, an image processing system may apply a convolutional neural network (CNN) to image observations (e.g., image signal intensity values associated with pixel locations of an image frame) to predict image signal intensity values in a processed image frame (e.g., for reproducing an image on a display device). With high resolution image processing, however, such application of a CNN for image-to-image reconstruction may be so computational intensive to be impractical. Additionally, for high dynamic range (HDR) content (>8 bits), quantized image-to-image networks may not adequately represent a full HDR range correctly if image signal intensity values are to be quantized to int8. In an embodiment, a kernel prediction network (KPN) may implement a separate data path for image signal intensity values, and predicted parameters. As such, image signal intensity values may not be fully quantized, resulting in lost information. A network to predict kernel coefficients, on the other hand, may be quantized heavily. As such, a KPN may accurately represent a full HDR range and a quantized KPN be run on specialized low-precision hardware, such as a Neural Processing Unit (NPU), for example.

According to an embodiment, a KPN may compute coefficients of a kernel to be applied to signal intensity values of an image. In a particular example in which an image frame is represented as red, blue and green color signal intensity values at pixel locations in the image frame, such coefficients of a single kernel may comprise a K×K number of coefficients to be applicable for determination of such a color signal intensity value at each pixel location. Consequently, while a KPN may provide some advantages over computationally intensive approaches such as execution of a CNN to predict individual color intensity values of a reconstructed image, a KPN may nonetheless significantly impact computational memory resources (e.g., to store a K×K number of floating point coefficients for each image signal intensity value for each color channel and at each pixel location and at different scales).

According to an embodiment, a KPN may be implemented at least in part as two components: a kernel regression component and a light-weight filtering component. The schematic block diagram of FIG. 1 depicts an example implementation of a KPN 100. In the particular illustrated implementation, KPN 100 may comprise a kernel regression network (KRN) 102 to determine kernel coefficients to be applied to image signal intensity values and a light-weight filtering portion 152 to apply kernel coefficients to image signal intensity values at various processing stages. Here, different prediction stages of KRN 102 may predict kernel coefficients to be applied in filtering/convolution operations at various processing stages 154, 156, 158, 160, 162 and 164 of light-weight filtering component 152 as shown. As depicted in FIG. 1, a sequence of processing stages 154 and 156 may impart a spatial downscaling of an image frame while a sequence of processing stages 162 and 164 may impart a spatial upscaling to a downscaled image frame.

In a particular implementation, KRN 102 may determine coefficients 116, 118 and 120 at stages 110, 112 and 114, respectively, as predictions to be computed by one or more neural networks (NNs). For example, such a neural network may include weights associated with nodes having been determined from machine learning operations using back-propagation operations based, at least in part, on application of a loss function to a result of output of filter network after the kernel coefficients have been applied and "ground truth" observations.

According to an embodiment, a processing stage in light-weight filtering portion 152 may apply predicted kernel coefficients in a filtering operation for computing an image signal intensity value for a particular color channel at a particular pixel location based on image signal intensity values of pixel locations local to the particular pixel location. For example, such a processing stage may apply corresponding coefficients to each image signal intensity value for the particular color channel in a K×K pixel region that is centered about the particular pixel location.

In some implementations, KPNs may enable processing of higher quantization of over other classes of neural network-based image processing. While this may make KPN-style architectures a very desirable candidate for processing HDR content on a neural processing unit (NPU), which may exclusively operate in integer precision. Predicting a unique K×K filter per color channel and per pixel, however, a KPN may significantly consume limited memory resources. For example, a series of per-pixel 5×5 filters for one or more color channels of a 1080×1920 pixel array may require a ~50 MB (1080*1920*5*5) output buffer from a single Kernel Regression Network inference with 8-bit quantization.

Briefly, particular embodiments described herein are directed to application of kernel coefficients that are derived from predefined sets of kernel values. In an implementation, a neural network may be applied to image signal intensity values associated with pixel locations in one or more image frames to generate one or more indices. One or more predefined sets of kernel values may be selected according to the generated one or more indices. A portion of image signal intensity values associated with pixel locations in at least one of the one or more image frames may then be processed by application of a convolution operation based, at least in part, on at least one of the selected one or more predefined sets of kernel values. By deriving kernel coefficients from predefined sets of kernel values in lieu of generation of a unique set of K×K kernel coefficient for each pixel location in an image, memory usage may be reduced substantially.

In a particular implementation, a kernel lookup network (KLN) may maintain a static or dynamic volume of predefined kernel values that are selectable based on computed indices. According to an embodiment, in certain filtering operations (e.g., denoising) variability between and/or among kernel coefficients derived from a KPN may be relatively small. This may allow an extent of kernel coefficients relevant to a use-case to be compressed into a volumetric data structure and/or array, with dimensionality that can be tuned to reside within an L2 cache of a given processing hardware target, for example. An output from a KLN may comprise indices (e.g., an N-dimension feature vector) associated with positions in a volumetric data structure and/or array storing predefined sets of kernel values. In a particular implementation, kernel coefficients may be computed based, at least in part, on an interpolation between and/or among kernel values associated with adjacent positions in the volumetric data structure and/or array. The computed kernel coefficients may then be applied in a convolution operation to impart one or more effects to image signal intensity values of one or more image frames.

In particular implementations, a volumetric data structure and/or array storing predefined sets of kernel values may enable a decoupling of an output vector size of a KLN from a kernel size for application in a filtering operation. For example, a KLN trained with a 'feature_vector_size=3' may leverage a volume of 5×5 filters to achieve per-pixel, per color channel 5×5 filtering, like a KPN, but stay within an output memory footprint of a 1080×1920 pixel RGB frame of ~6 MB (1080*1920*3), for example.

Figure 2:
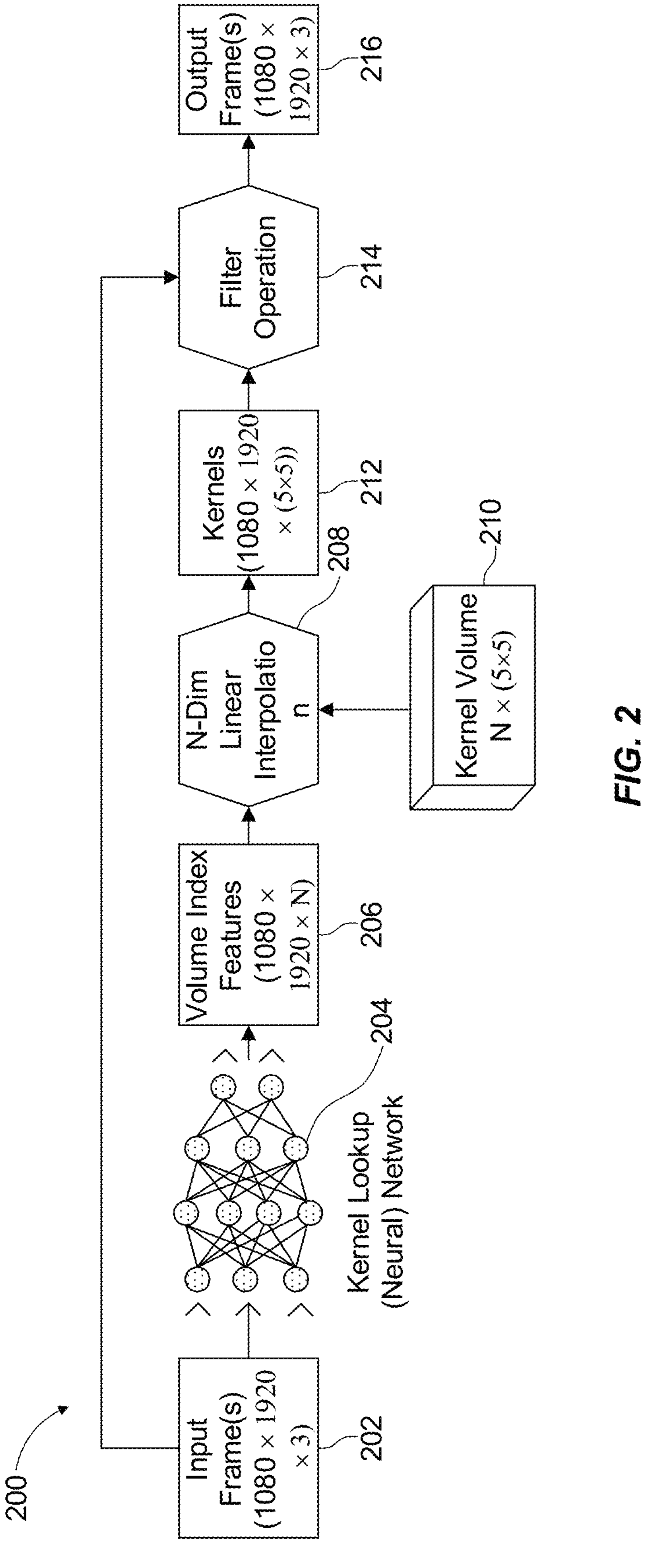
FIG. 2 is a flow diagram of a process to apply a filtering operation to image signal values of one or more image frames, according to an embodiment.

FIG. 2 is a flow diagram of a system 200 to apply a filtering operation to image signal values of one or more image frames, according to an embodiment. According to an embodiment, image frame(s) 202 may be expressed at least in part as image signal intensity values associated with pixel locations according to an image format (e.g., 1080×1920 pixel format). Image signal intensity values in image frame(s) 202 may be associated with pixel locations defined in image frame(s) 202, and may include image signal intensity values (e.g., in a floating point format) for multiple color channels such as red, blue and green. It should be understood, however, that image frame(s) 202 may be expressed as image signal intensity values for multiple color channels according to a different format.

In a particular implementation, kernel coefficients 212 may be applied in filtering operation 214 to impart one or more effects to image signal intensity values associated with pixel locations in input fame(s) 202. Kernel coefficients 212 may be applied to signal intensity values of an image in one or more filtering operations by filtering operation 214. In this context, a "kernel" as referred to herein means a set of organized parameters of a convolution operation to be applied to one or more image signal values expressing an image frame, such as color intensity values associated with pixel locations in the image, to impart a particular intended effect to the image. Such an intended effect may comprise, for example, blurring, sharpening, embossing, denoising, feature detection/extraction (e.g., edge detection), just to provide a few examples. In a particular implementation, a kernel may comprise an ordered array of values (e.g., coefficients in a floating point format) tailored for application to image signal intensity values of a particular dimensionality such as dimensions corresponding to color intensity values and/or pixel location. According to an embodiment, a filtering operation (such as filtering operation 214) for application of a kernel to signal intensity values of an image may be implemented according to expression (1) as follows:

$$g(x, y) = \omega * f(x, y) = \sum_{dx=-a}^{a} \sum_{dy=-b}^{b} \omega(dx, dy) f[(x + dx), (y + dy)], \quad (1)$$

where:

f(x, y) are image signal intensity values to represent an original image at pixel locations x,y of the original image;

ω is an expression of a kernel defined over a range −a≤dx≤a and −b≤dy≤b; and g(x, y) are image signal intensity values to represent an image at pixel locations x,y processed according to kernel w processed image.

According to an embodiment, w may be implemented as kernel coefficients 212 to be derived, at least in part, from application of a neural network in kernel lookup network (KLN) 204. Kernel coefficients 212 may be determined based, at least in part, on one or more predefined sets of kernel values obtained from volumetric data structure and/or array 210 according to one or more indices determined based, at least in part, on image signal intensity values of image frame(s) 202. In a particular implementation, such indices may reference positions in one or more memory devices in which the one or more predefined sets of kernel values are stored as signals and/or states. Such indices may be determined based, at least in part, on a mapping of image signal intensity values of image frame(s) 202 to index values 206 according to kernel lookup network 204, for example. In a particular implementation in which activation and/or output values of KLN 204 are quantized to eight bits, predicted values for ordered pairs of index values 206 may have a value expressed from 0 to 255 that may be mapped to a point between and/or among an ordered pair of integers.

According to an embodiment, KLN 204 may comprise a layered neural network, such as a CNN, to generate index values 206 as predictions at an output layer responsive to image signal intensity values of image frame(s) 202 applied as activation input values at input layer. In other implementations, KLN 204 may receive other inputs (e.g., in addition to image signal intensity values associated with color channels at pixel locations in an image frame), such as geometry information obtained from a graphics pipeline buffer. In an implementation, weights applied at nodes to compute index values 206 may be determined in a machine learning process such as a supervised machine learning process in which image frames are provided as sets of training parameters as input frame(s) 202. In such a supervised machine learning process, a loss function defined by resulting frame(s) 216 and ground truth frame(s) may be minimized over training iterations while node weights of KLN 204 and/or values stored in volumetric data structure and/or array 210 are tuned using gradient back propagation.

Figure 3:
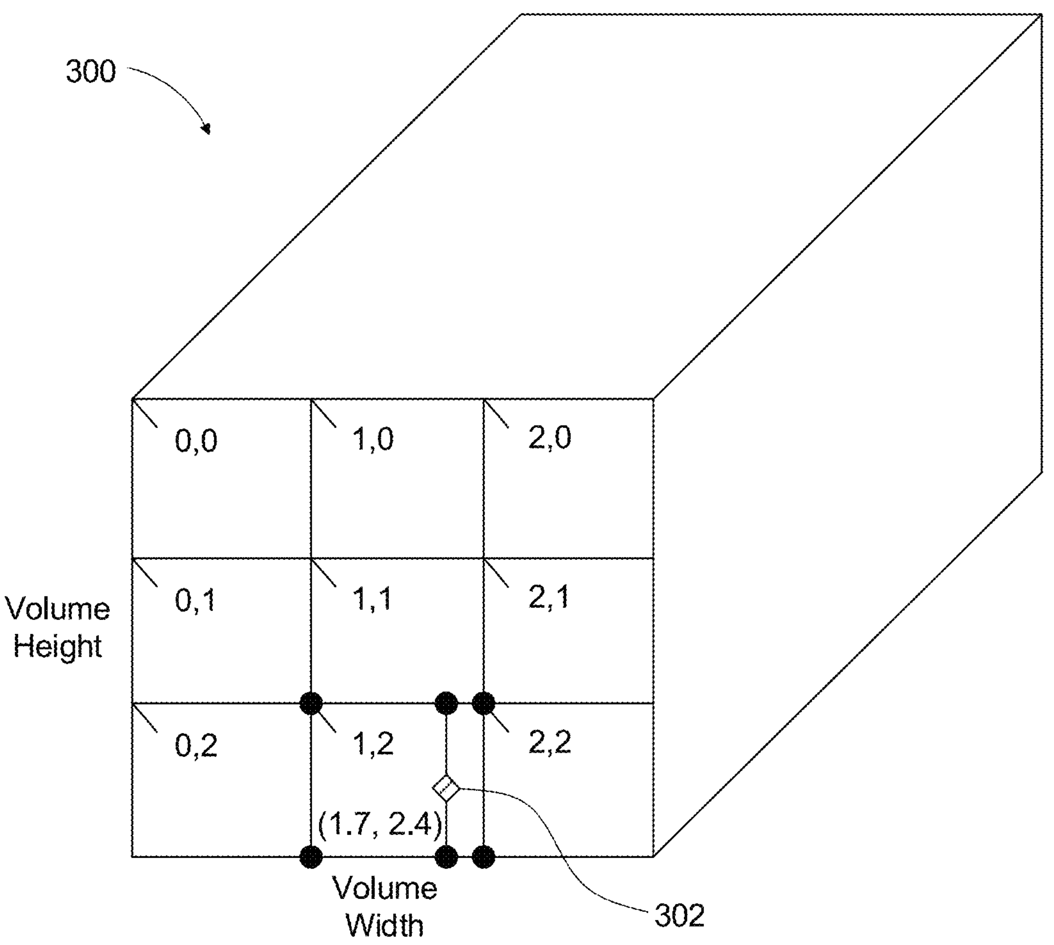
FIG. 3 is a schematic diagram of predetermined sets of kernel values maintained in an array, according to an embodiment.

According to an embodiment, kernel coefficients 212 may, for a pixel location in an output image frame(s) 216, be applied in a filtering/convolution operation to compute an image signal intensity value based on image signal intensity values associated with multiple pixel locations in an input image frame(s) 202. For example, kernel coefficients 212 may comprise 25 values to be applied as coefficients to image signal intensity values (e.g., of a particular color channel) that are associated with a 5×5 portion of pixels of input image frame 202. In a particular implementation of FIG. 3, kernel values maintained in a volumetric data structure and/or array 300 may be maintained as multiple vectors of 25 kernel values each, wherein each such vector is to map to 25 kernel coefficients to be applied to image signal intensity values of a 5×5 portion of an input image frame 202 (e.g., as shown in expression (1)). Each such a 25 element vector may be associated with (and/or be accessible by) an ordered pair of integers (e.g., (0,0) to (2,2) as shown).

According to an embodiment, machine learning operations to train weights associated with nodes of KLN 204 may be executed according a particular loss function such as, for example, a loss function to compute least square error components from a comparison of computed output frames 216 to ground truth labels in training sets. In applications such as denoising and super-resolution, a loss function may comprise computation of a mean square error (MSE) between output image signal intensity values and ground truth image signal intensity values. In an implementation of a classifications/segmentation loss function, such a loss function may comprise computation of an MSE between predictions and hot-1 encoded ground truth. These are merely examples of how computation of an MSE may be implemented in a loss function, but claimed subject matter is not limited in this respect. In an implementation of a Generative adversarial network, for example, a loss function may be computed as an adversarial loss. In a particular implementation, backpropagation in training operations may update and/or tune kernel values (e.g., maintained in volumetric data structure and/or array 310) and/or parameters of an interpolation operation to determine kernel coefficients 212 based on kernel values, in addition to weights associated with nodes of KLN 204. For example, such backpropagation in training operations may apply one or more gradient functions to a loss function to update and/or tune weights associated with nodes of KLN 204, kernel values maintained in volumetric data structure and/or array 210/310, and/or parameters to define operations to interpolate between and/or among stored kernel values to determine kernel coefficients 212.

According to an embodiment, kernel coefficients 212 may be determined based, at least in part, on application of a hardware sampler to kernel values maintained in volumetric data structure and/or array 210/310. In this context, a "hardware sampler" as referred to herein means a device implemented by circuitry to compute a value (e.g., measurement or estimate) based on multiple signal observations. Such a hardware sampler implemented in a graphics processing unit (GPU) may comprise a tri-linear hardware sampler configurable to, for example, interpolate between image signal intensity values associated with two different pixel locations in an image frame. In one particular implementation, volumetric data structure and/or array 210/310 may be dimensioned so as to enable efficient interpolation between and/or among kernel values. A feature vector size of three, for example, may enable efficient application of a tri-linear hardware sampler to interpolate between and/or among kernel values to provide kernel coefficients.

In a machine learning process to tune kernel values maintained in volumetric data structure and/or array 210/310 (e.g., from application of a gradient to a loss function as set forth above), such kernel values may be initialized to a particular kernel distribution such as kernel coefficients for a set of Gaussian kernels, just as an example distribution. Alternatively, such kernel values may be randomly initialized.

According to an embodiment, for a particular pixel location and color channel for input image framed(s) 202, KLN 204 may generate index values 206 as an ordered pair of floating point or fixed-point values with a precision higher than a resolution of nodes/coordinates in volumetric data structure and/or array 210/310 such as, for example, (1.7, 2.4). In a particular 32-node implementation of volumetric data structure and/or array 210, index values 206 may comprise an ordered pair of 8-bit values, for example. Such an ordered pair of floating point values may not uniquely match an ordered pair of integer values referencing a single vector of 25 kernel values stored in volumetric data structure and/or array 300. Nonetheless such floating point values may be applied in an interpolation between and/or among kernel values of multiple different vectors stored in volumetric data structure and/or array 300. Continuing with the above example, a generated index (1.7, 2.4) may map to a point 302 on volumetric data structure and/or array 300, which is disposed within a square defined and/or bounded by integer indices (1,2), (2,2), (2,3) and (1,3) representing positions of associated vectors of kernel values. According to an embodiment, block 208 may generate kernel coefficients 212 corresponding to generated index (1.7, 2.4) as a weighted interpolation among kernel values positioned in volumetric data structure and/or array 300 according to indices (1,2), (2,2), (2,3) and (1,3). In a particular implementation in which activation and/or output values of KLN 204 are quantized to eight bits, predicted values for ordered pairs of index values 206 may have a value expressed from 0 to 255 that may be mapped to a point between and/or among an ordered pair of integers. In a particular example, for each position in a vector of kernel coefficients 212 to be applied to determine an intensity value of a pixel location in output frame(s) 216, block 208 may interpolate among kernel values at that position in vectors associated with indices (1,2), (2,2), (2,3) and (1,3). In one embodiment, block 208 may apply a linear interpolation, but any spline may be applied. In another particular implementation, block 208 may apply a non-linear interpolation function defined, at least in part, by parameters that are updatable/tunable in training operations to update/tune weights associated with nodes of KLN 204 and/or values maintained in volumetric data structure and/or array 210.

In one implementation, kernel values maintained in volumetric data structure and/or array 300 may be obtained from a library of kernel values derived computationally such as by a kernel regression network (KRN) 102. As pointed out above, weights to be applied at nodes of a neural network forming KLN 204 may be determined and/or tuned in training operations such as supervised machine-learning operations. According to an embodiment, such supervised machine-learning operations may concurrently determine and/or tune weights to be applied at nodes of a neural network forming KLN 204 and kernel values to be maintained in volumetric data structure and/or array 310 using the same training set and loss function.

According to an embodiment, machine learning operations to train weights associated with nodes of KLN 204 may be executed according a particular loss function such as, for example, a loss function to compute least square error components from a comparison of computed output frames 216 to ground truth labels in training sets. In a particular implementation, backpropagation in training operations may update and/or tune kernel values (e.g., maintained in volumetric data structure and/or array 310) and/or parameters of an interpolation operation to determine kernel coefficients 212 based on kernel values, in addition to weights associated with nodes of KLN 204. For example, such backpropagation in training operations may apply multiple gradient values according to a loss function to update and/or tune weights associated with nodes of KLN 204, kernel values maintained in volumetric data structure and/or array 210/310, and/or parameters to define operations to interpolate between and/or among stored kernel values to determine kernel coefficients 212.

Figure 4:
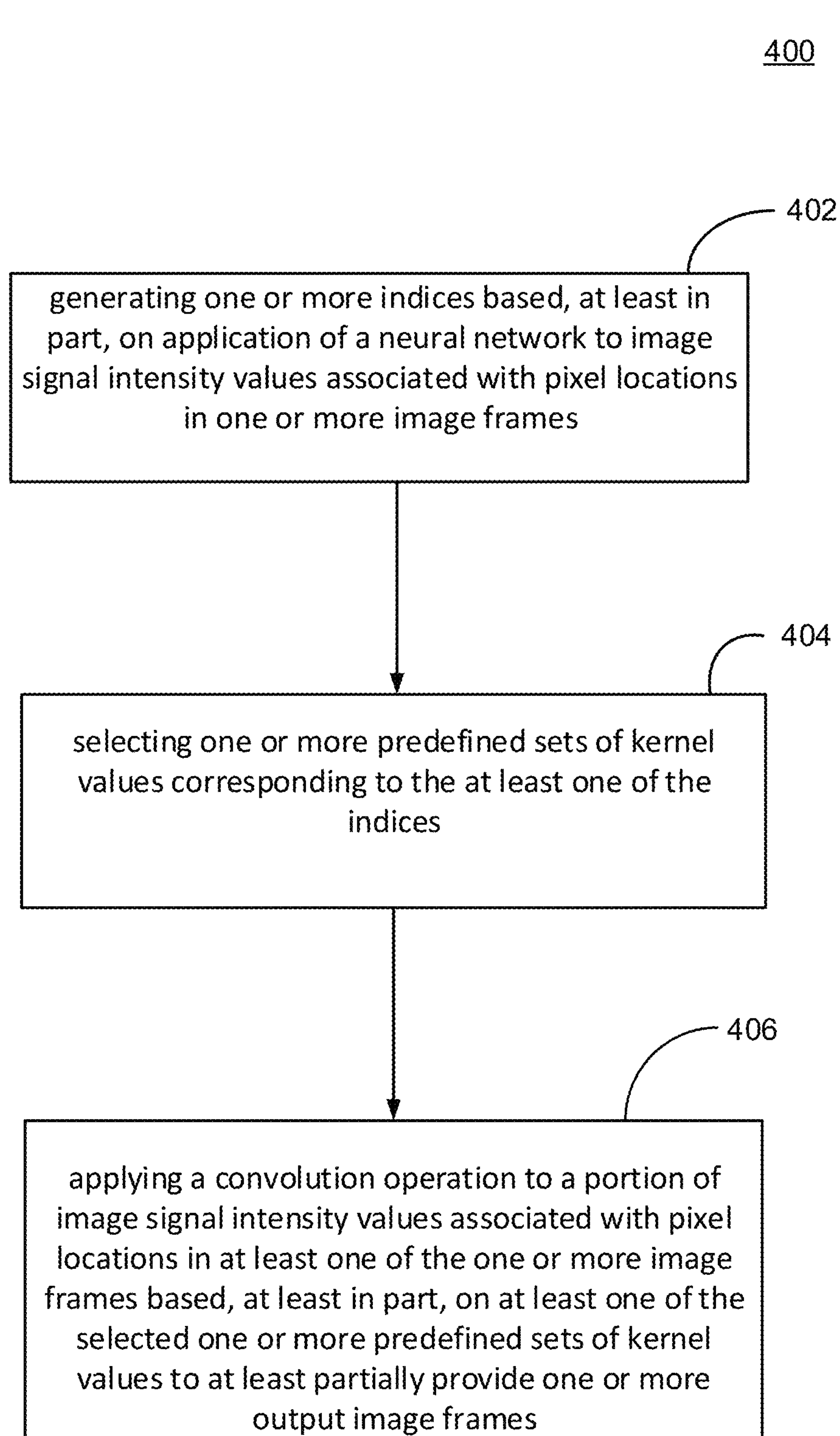
FIG. 4 is a flow diagram of a process according to an embodiment.

FIG. 4 is a flow diagram of a process 400 to apply a convolution operation to image signal intensity values of an image frame according to an embodiment. Block 402 may comprise generation of one or more indices based, at least in part, on application of a neural network to image signal intensity values associated with at least one pixel locations in one or more image frames. In a particular implementation, block 402 may comprise application of KLN 204 to input image frame(s) 202 to generate indices 206 as ordered pairs and/or tuples of floating point values. In a particular example in which an input image frame defines multiple image signal intensity values for a pixel location for corresponding color channels, block 402 may generate a corresponding ordered pair of floating point values for the pixel location at each color channel.

According to an embodiment, for an ordered pair of floating point values generated by block 402 as an index, block 404 may select one or more sets of kernel values corresponding to an ordered pair of floating point values. For example, block 404 may comprise mapping a set (e.g., an ordered pair) of floating point values generated at block 402 to sets (e.g., ordered pairs) of integer values indexing vectors of kernel values maintained in volumetric data structure and/or array 300. As discussed above, kernel coefficients to be applied to image signal intensity values in block 406 may be derived, at least in part, from an interpolation between and/or among kernel values maintained in volumetric data structure and/or array 300 according to the ordered pairs of integer values.

Block 406 may comprise application of kernel coefficients to image signal intensity values of an input image frame in a filtering operation such as a convolution operation according to expression (1), for example. Here, a kernel a may comprise kernel coefficients derived at least in part from kernel values selected at block 404 for example. In a particular implementation, block 406 may comprise application of a convolution operation according to expression (1) to image signal intensity values for each color channel at each color channel of an input image frame.

According to an embodiment, a neural network may comprise a graph comprising nodes to model neurons in a brain. In this context, a "neural network" as referred to herein means an architecture of a processing device defined and/or represented by a graph including nodes to represent neurons that process input signals to generate output signals, and edges connecting the nodes to represent input and/or output signal paths between and/or among neurons represented by the graph. In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented by one or more computing devices such as computing devices such as computing devices including a central processing unit (CPU), graphics processing unit (GPU), digital signal processing (DSP) unit and/or neural processing unit (NPU), just to provide a few examples. In a particular implementation, neural network weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, a neuron may apply a neural network weight to input signals, and sum weighted input signals to generate a linear combination.

According to an embodiment, edges in a neural network connecting nodes may model synapses capable of transmitting signals (e.g., represented by real number values) between neurons. Responsive to receipt of such a signal, a node/neuron may perform some computation to generate an output signal (e.g., to be provided to another node in the neural network connected by an edge). Such an output signal may be based, at least in part, on one or more weights and/or numerical coefficients associated with the node and/or edges providing the output signal. For example, such a weight may increase or decrease a strength of an output signal. In a particular implementation, such weights and/or numerical coefficients may be adjusted and/or updated as a machine learning process progresses. In an implementation, transmission of an output signal from a node in a neural network may be inhibited if a strength of the output signal does not exceed a threshold value.

Figure 5:
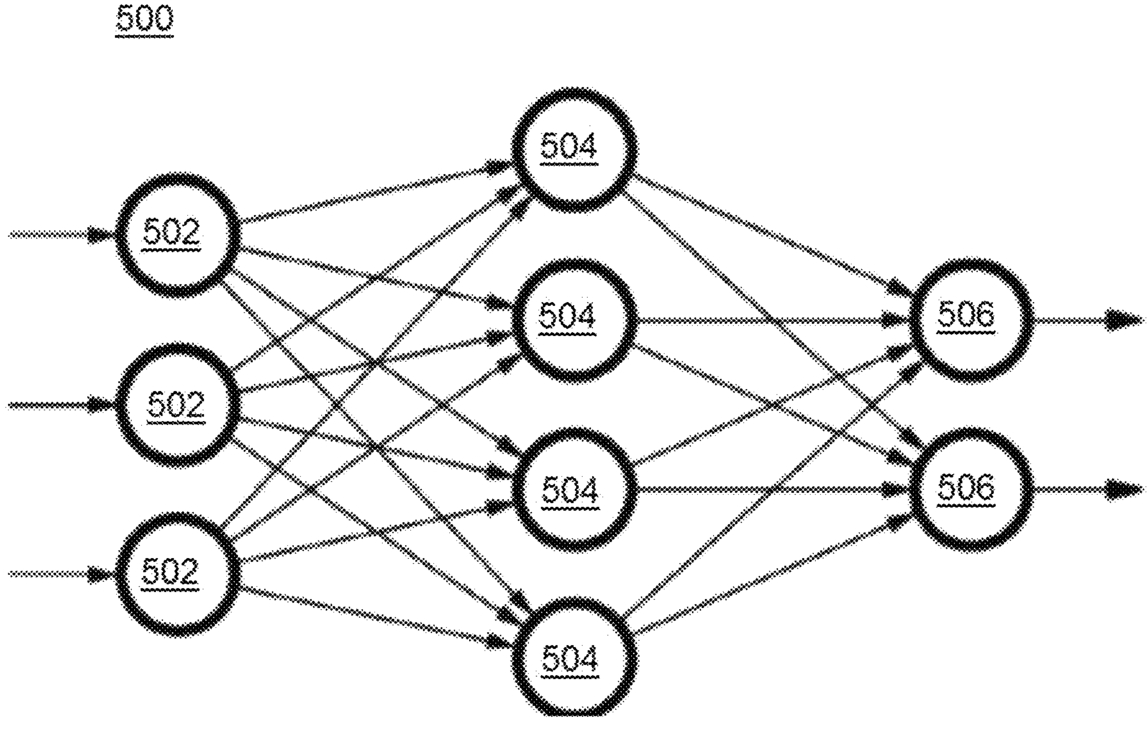
FIG. 5 is a schematic diagram of a neural network formed in "layers", according to an embodiment.

FIG. 5 is a schematic diagram of a neural network 500 formed in "layers" in which an initial layer is formed by nodes 502 and a final layer is formed by nodes 506. Neural network (NN) 500 also includes an intermediate layer formed by nodes 504. Edges shown between nodes 502 and 504 illustrate signal flow from an initial layer to an intermediate layer. Likewise, edges shown between nodes 504 and 506 illustrate signal flow from an intermediate layer to a final layer. While neural network 500 shows a single intermediate layer formed by nodes 504, it should be understood that other implementations of a neural network may include multiple intermediate layers formed between an initial layer and a final layer. Such intermediate layers may included fully connected, convolution, activation, normalization or attention layers, for example.

According to an embodiment, a node 502, 504 and/or 506 may process input signals (e.g., received on one or more incoming edges) to provide output signals (e.g., on one or more outgoing edges) according to an activation function. An "activation function" as referred to herein means a set of one or more operations associated with a node of a neural network to map one or more input signals to one or more output signals. In a particular implementation, such an activation function may be defined based, at least in part, on a weight associated with a node of a neural network. Operations of an activation function to map one or more input signals to one or more output signals may comprise, for example, identity, binary step, logistic (e.g., sigmoid and/or soft step), hyperbolic tangent, rectified linear unit, Gaussian error linear unit, Softplus, exponential linear unit, scaled exponential linear unit, leaky rectified linear unit, parametric rectified linear unit, sigmoid linear unit, Swish, Mish, Gaussian and/or growing cosine unit operations. It should be understood, however, that these are merely examples of operations that may be applied to map input signals of a node to output signals in an activation function, and claimed subject matter is not limited in this respect. Additionally, an "activation input value" as referred to herein means a value provided as an input parameter and/or signal to an activation function defined and/or represented by a node in a neural network. Likewise, an "activation output value" as referred to herein means an output value provided by an activation function defined and/or represented by a node of a neural network. In a particular implementation, an activation output value may be computed and/or generated according to an activation function based on and/or responsive to one or more activation input values received at a node. In a particular implementation, an activation input value and/or activation output value may be structured, dimensioned and/or formatted as "tensors". Thus, in this context, an "activation input tensor" as referred to herein means an expression of one or more activation input values according to a particular structure, dimension and/or format. Likewise in this context, an "activation output tensor" as referred to herein means an expression of one or more activation output values according to a particular structure, dimension and/or format.

In particular implementations, intelligent computing devices to perform functions supported by neural networks may comprise a wide variety of stationary and/or mobile devices, such as, for example, automobile sensors, biochip transponders, heart monitoring implants, Internet of things (IoT) devices, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, just to provide a few examples.

According to an embodiment, a neural network may be structured in layers such that a node in a particular neural network layer may receive output signals from one or more nodes in an upstream layer in the neural network, and provide an output signal to one or more nodes in a downstream layer in the neural network. One specific class of layered neural networks may comprise a convolutional neural network (CNN) or space invariant artificial neural networks (SIANN) that enable deep learning. Such CNNs and/or SIANNs may be based, at least in part, on a shared-weight architecture of a convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

Another class of layered neural network may comprise a recursive neural network (RNN) that is a class of neural networks in which connections between nodes form a directed cyclic graph along a temporal sequence. Such a temporal sequence may enable modeling of temporal dynamic behavior. In an implementation, an RNN may employ an internal state (e.g., memory) to process variable length sequences of inputs. This may be applied, for example, to tasks such as unsegmented, connected handwriting recognition or speech recognition, just to provide a few examples. In particular implementations, an RNN may emulate temporal behavior using finite impulse response (FIR) or infinite impulse response (IIR) structures. An RNN may include additional structures to control stored states of such FIR and IIR structures to be aged. Structures to control such stored states may include a network or graph that incorporates time delays and/or has feedback loops, such as in long short-term memory networks (LSTMs) and gated recurrent units.

According to an embodiment, output signals of one or more neural networks (e.g., taken individually or in combination) may at least in part, define a "predictor" to generate prediction values associated with some observable and/or measurable phenomenon and/or state. In an implementation, a neural network may be "trained" to provide a predictor that is capable of generating such prediction values based on input values (e.g., measurements and/or observations) optimized according to a loss function. For example, a training process may employ back propagation techniques to iteratively update neural network weights to be associated with nodes and/or edges of a neural network based, at least in part on "training sets." Such training sets may include training measurements and/or observations to be supplied as input values that are paired with "ground truth" observations. Based on a comparison of such ground truth observations and associated prediction values generated based on such input values in a training process, weights may be updated according to a loss function using backpropagation.

According to an embodiment KPN 100 and/or all or a portion of system 200 may be formed by and/or expressed, in whole or in part, in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented to include, but not be limited to, formats supporting behavioral languages such as C, Verilog, and VHDL, formats supporting register level description languages like RTL, formats supporting geometry description languages such as GDSII, GDSIII, GDSIV, CIF, MEBES and any other suitable formats and languages. Storage media in which such formatted data and/or instructions may be embodied to include, but not be limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves may include, but not be limited to, transfers (uploads, downloads, e-mail, etc.) over the Internet and/or other computer networks via one or more electronic communication protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

For one or more embodiments, KPN 100 and/or all or a portion of system 200 may be implemented in a device, such as a computing device and/or networking device, that may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples, however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Figure 6:
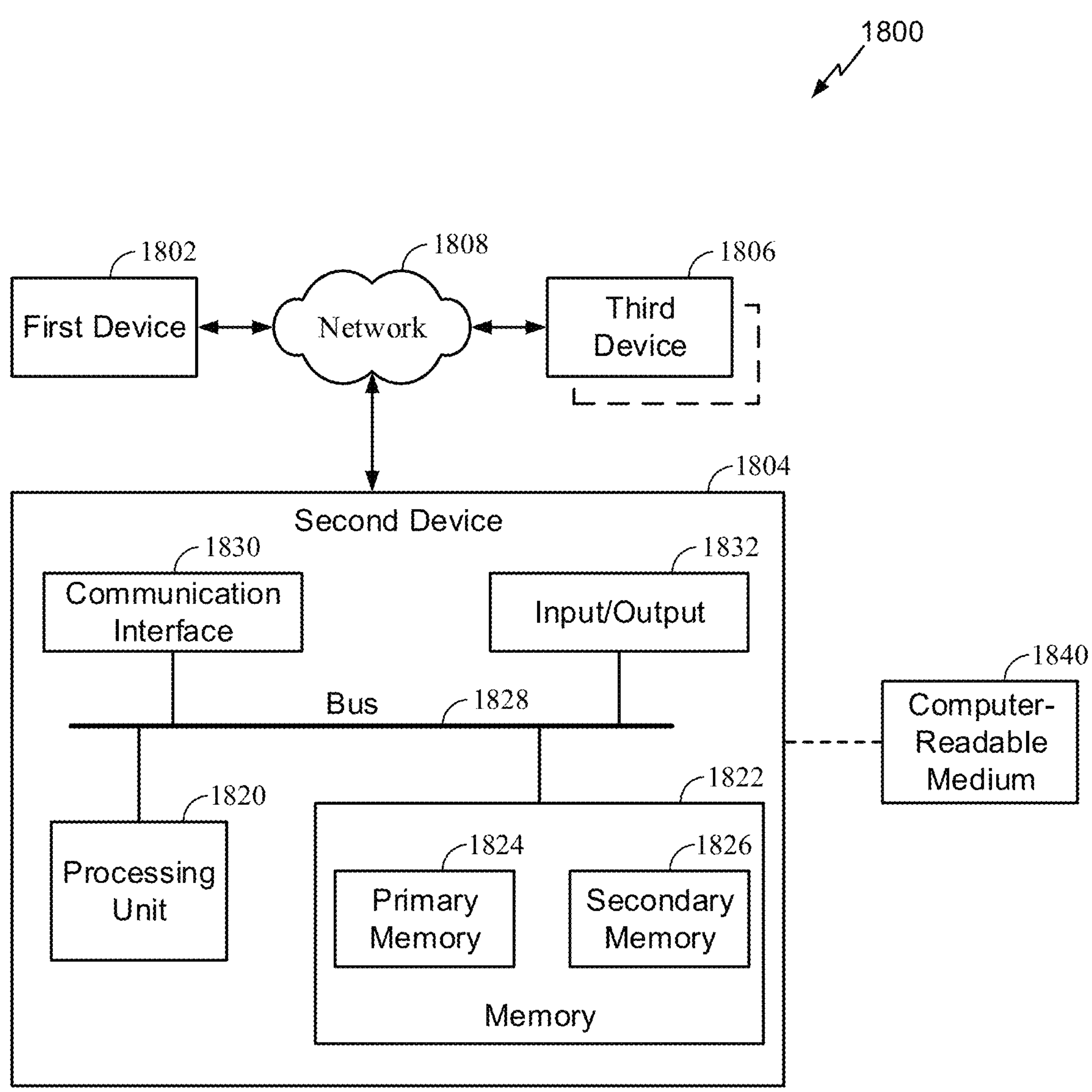
FIG. 6 is a schematic block diagram of an example computing system in accordance with an implementation.

FIG. 6 shows an embodiment 1800 of a system that may be employed to implement either type or both types of networks. Network 1808 may comprise one or more network connections, links, processes, services, applications, and/or resources to facilitate and/or support communications, such as an exchange of communication signals, for example, between a computing device, such as 1802, and another computing device, such as 1806, which may, for example, comprise one or more client computing devices and/or one or more server computing device. By way of example, but not limitation, network 1808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 6 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals.

Referring now to FIG. 6, in an embodiment, first and third devices 1802 and 1806 may be capable of rendering a graphical user interface (GUI) for a network device and/or a computing device, for example, so that a user-operator may engage in system use. Device 1804 may potentially serve a similar function in this illustration. Likewise, in FIG. 6, computing device 1802 ('first device' in figure) may interface with computing device 1804 ('second device' in figure), which may, for example, also comprise features of a client computing device and/or a server computing device, in an embodiment. Processor (e.g., processing device) 1820 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1804, as depicted in FIG. 6, is merely one example, and claimed subject matter is not limited in scope to this particular example. FIG. 6 may further comprise a communication interface 1830 which may comprise circuitry and/or devices to facilitate transmission of messages between second device 1804 and first device 1802 and/or third device 1806 in a physical transmission medium over network 1808 using one or more network communication techniques identified herein, for example. In a particular implementation, communication interface 1830 may comprise a transmitter device including devices and/or circuitry to modulate a physical signal in physical transmission medium according to a particular communication format based, at least in part, on a message that is intended for receipt by one or more recipient devices. Similarly, communication interface 1830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, GNSS receiver and/or other location-identifying type capability, and/or a display with a higher degree of functionality, such as a touch-sensitive color 5D or 3D display, for example.

In FIG. 6, computing device 1802 may provide one or more sources of executable computer instructions in the form physical states and/or signals (e.g., stored in memory states), for example. Computing device 1802 may communicate with computing device 1804 by way of a network connection, such as via network 1808, for example. As previously mentioned, a connection, while physical, may not necessarily be tangible. Although computing device 1804 of FIG. 6 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to execute the fetched instructions. Memory 1822 may also comprise a memory controller for accessing device readable-medium 1840 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 6, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 6 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:

generating one or more indices based, at least in part, on application of a neural network to one or more attributes of one or more image frames;

identifying one or more sets of defined kernel values corresponding to the at least one of the one or more indices; and applying kernel coefficients derived, at least in part, from the identified one or more sets of defined kernel values to at least one of the one or more image frames in a convolution operation to at least partially provide one or more output image frames.

2. The method of claim 1, wherein applying the kernel coefficients to the at least one of the one or more image frames comprises applying the kernel coefficients to a portion of image signal intensity values associated with pixel locations in the at least one of the one or more image frames.

3. The method of claim 1, wherein weights applied to nodes of the neural network and the sets of defined kernel values are determined based, at least in part, on backpropagation operations according to a loss function, the loss function to be compute based, at least in part, on output image frames computed from application of the sets of kernel values and ground truth image frames.

4. The method of claim 1, wherein the sets of defined kernel values are stored in associated contiguous subarrays within a larger array of kernel values, wherein the one or more indices map to locations of the subarrays with the larger array of kernel values.

5. The method of claim 4, wherein adjacent subarrays in the larger array contain kernel values form associated endpoints of a continuum of kernel coefficients between associated sets of kernel values of the adjacent subarrays such that applied kernel coefficients are interpolated between such adjacent subarrays of kernel values based, at least in part, on a mapping of the generated one or more indices to the larger array of kernel values.

6. The method of claim 1, and further comprising applying a hardware sampler to the identified one or more sets of defined kernel values to derive the kernel coefficients.

7. The method of claim 6, wherein applying the hardware sampler to the identified one or more sets of defined kernel values to derive kernel coefficients further comprises:

interpolating between and/or among kernel values in two or more defined sets of kernel values, the two or more defined sets of kernel values being selected based, at least in part, on the at least one of the one or more indices.

8. The method of claim 7, wherein:

each of the two or more defined sets of kernel values comprises an array of kernel values, the array containing kernel values stored in associated positions in the array; and interpolating between and/or among kernel values in the two or more defined sets of kernel values further comprises weighting between and/or among kernel values in a common position in arrays of the two or more defined sets of kernel values based, at least in part, on the generated one or more indices.

9. The method of claim 1, wherein the attributes of the one or more image frames comprise image signal intensity values associated with pixel locations in the one or more image frames, or one or more geometric parameters obtained from a graphics pipeline buffer, or a combination thereof.

10. The method of claim 1, wherein the one or more sets of defined kernel values are selected from among a plurality of sets of defined kernel values, and wherein weights associated with nodes of the neural network and kernel values of the plurality of sets of defined kernel values are determined based, at least in part, on application of a first gradient function to backpropagate changes to the weights associated with the nodes and a second gradient function to backpropagate changes to the kernel values of the plurality of sets of defined kernel values.

11. An article comprising:

a non-transitory storage medium comprising computer-readable instructions stored thereon which are executable by one or more processors of a computing device to:

generate one or more indices based, at least in part, on application of a neural network to one or more attributes of one or more image frames;

identify one or more sets of defined kernel values corresponding to the at least one of the one or more indices; and apply kernel coefficients derived, at least in part, from the identified one or more sets of defined kernel values to at least one of the one or more image frames in a convolution operation to at least partially provide one or more output image frames.

12. The article of claim 11, wherein the computer-readable instructions are further executable by the one or more processors to:

apply a hardware sampler to the identified one or more sets of defined kernel values to derive kernel coefficients.

13. A computing device comprising:

a memory; and one or more processors coupled to the memory to:

generate one or more indices based, at least in part, on application of a neural network to one or more attributes of one or more image frames;

identify one or more sets of defined kernel values corresponding to the at least one of the one or more indices; and apply kernel coefficients derived, at least in part, from the identified one or more sets of defined kernel values to at least one of the one or more image frames in a convolution operation to at least partially provide one or more output image frames.

14. The computing device of claim 13, wherein application of the kernel coefficients to the at least one of the one or more image frames comprises application of the kernel coefficients to a portion of image signal intensity values associated with pixel locations in the at least one of the one or more image frames.

15. The computing device of claim 13, wherein the one or more processors are further to apply a hardware sampler to the identified one or more sets of defined kernel values to derive kernel coefficients.

16. The computing device of claim 13, wherein weights applied to nodes of the neural network and the sets of defined kernel values are determined based, at least in part, on backpropagation operations according to a loss function, the loss function to be compute based, at least in part, on output image frames computed from application of the sets of kernel values and ground truth image frames.

17. The computing device of claim 13, wherein the sets of defined kernel values are stored in associated contiguous subarrays within a larger array of kernel values, wherein the one or more indices map to locations of the subarrays with the larger array of kernel values.

18. The computing device of claim 17, wherein adjacent subarrays in the larger array contain kernel values form associated endpoints of a continuum of kernel coefficients between associated sets of kernel values of the adjacent subarrays such that applied kernel coefficients are interpolated between such adjacent subarrays of kernel values based, at least in part, on a mapping of the generated one or more indices to the larger array of kernel values.

19. The computing device of claim 13, wherein the one or more processors are further to interpolate between and/or among kernel values in two or more defined sets of kernel values, the two or more defined sets of kernel values being selected based, at least in part, on the at least one of the one or more indices.

20. The computing device of claim 19, wherein:

each of the two or more defined sets of kernel values comprises an array of kernel values, the array of kernel values containing kernel values stored in associated positions in the array; and interpolating between and/or among kernel values in the two or more defined sets of kernel values further comprises weighting between and/or among kernel values in a common position in arrays of the two or more defined sets of kernel values based, at least in part, on the generated one or more indices.

* * * * *